United States Patent
Itoh

(10) Patent No.: US 9,679,231 B2
(45) Date of Patent: Jun. 13, 2017

(54) COPIER AND METHOD IN WHICH PRINT PROCESSING PROCEEDS PRIOR TO STORING ALL READ IMAGE DATA EXCEEDING PREDETERMINED SIZE WHEN ACS IS SELECTED

(71) Applicant: CANON KABUSHIKI KAISHA, Tokyo (JP)

(72) Inventor: Jun Itoh, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/208,630

(22) Filed: Mar. 13, 2014

(65) Prior Publication Data

US 2014/0293354 A1   Oct. 2, 2014

(30) Foreign Application Priority Data

Mar. 27, 2013 (JP) ................... 2013-067199
Dec. 17, 2013 (JP) ................... 2013-260506

(51) Int. Cl.
*H04N 1/32* (2006.01)
*G06K 15/02* (2006.01)
*H04N 1/40* (2006.01)

(52) U.S. Cl.
CPC ..... *G06K 15/1886* (2013.01); *H04N 1/32454* (2013.01); *H04N 1/40* (2013.01); *H04N 1/40062* (2013.01)

(58) Field of Classification Search
None
See application file for complete search history.

(56) References Cited

U.S. PATENT DOCUMENTS

| | | | |
|---|---|---|---|
| 5,726,762 A * | 3/1998 | Akada et al. | 358/401 |
| 7,307,762 B2 | 12/2007 | Yaguchi | |
| 7,532,348 B2 * | 5/2009 | Yaguchi | 358/1.15 |
| 8,446,628 B2 * | 5/2013 | Kashimoto | G06K 15/02 358/1.16 |
| 8,508,823 B2 * | 8/2013 | Usui | 358/538 |
| 2007/0109573 A1 * | 5/2007 | Hirayama | H04N 1/56 358/1.13 |

FOREIGN PATENT DOCUMENTS

| EP | 503644 B1 * | 6/1997 |
|---|---|---|
| JP | 2004-266513 A | 9/2004 |

* cited by examiner

*Primary Examiner* — Paul F Payer
(74) *Attorney, Agent, or Firm* — Fitzpatrick, Cella, Harper & Scinto

(57) ABSTRACT

No chase control is performed in copying utilizing ACS (auto color select) determination processing. ACS determination is performed to determine whether image data is color or black-and-white image data and the chase control is performed after the ACS determination is completed.

23 Claims, 17 Drawing Sheets

$L$ [line] LENGTH OF IMAGE IN SUB-SCANNING DIRECTION
$v_s$ [line/sec] SCAN PROCESSING SPEED
$v_p$ [line/sec] PRINT PROCESSING SPEED
$l_m$ [line] CHASE CONTROL START POSITION

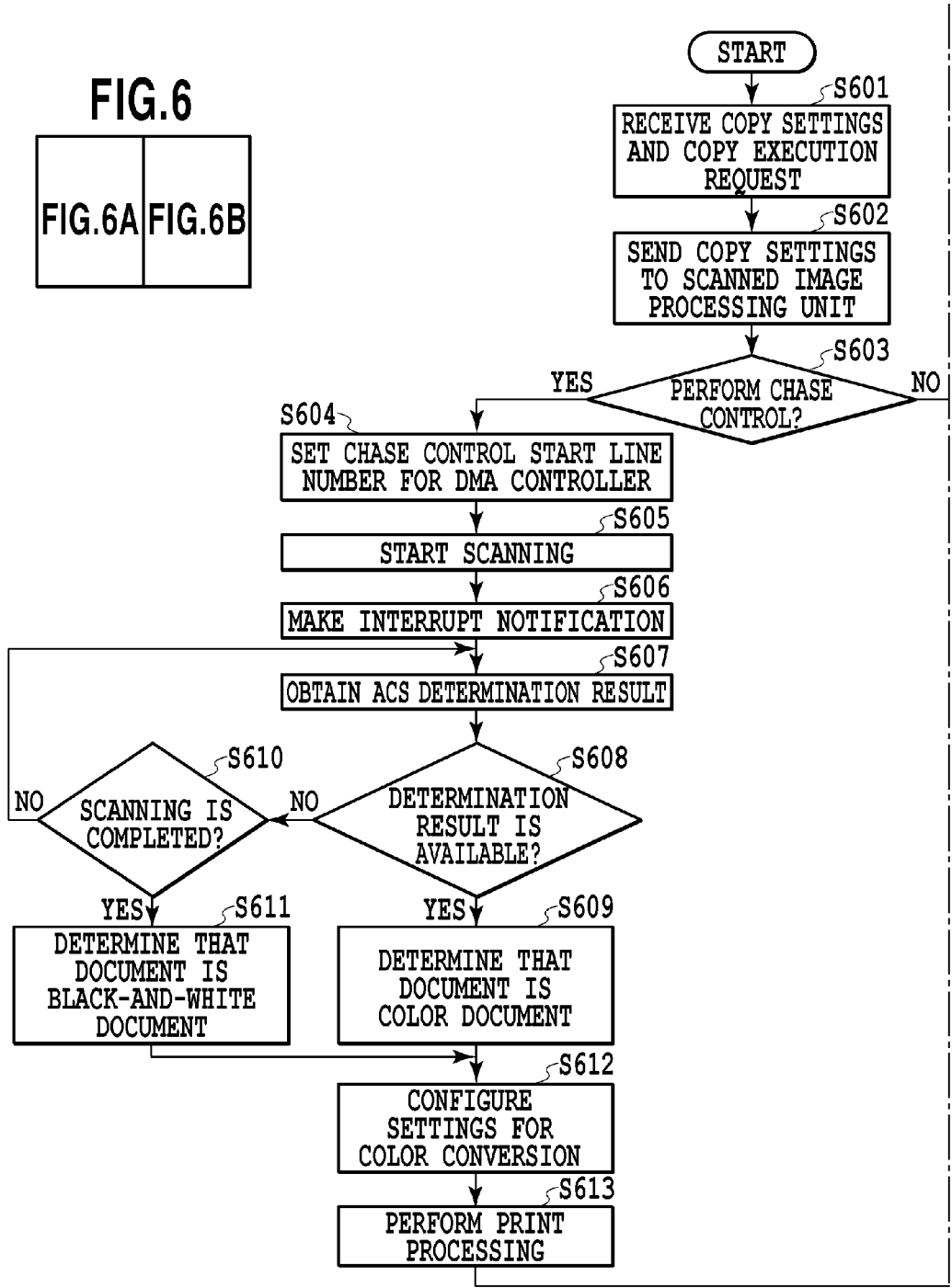

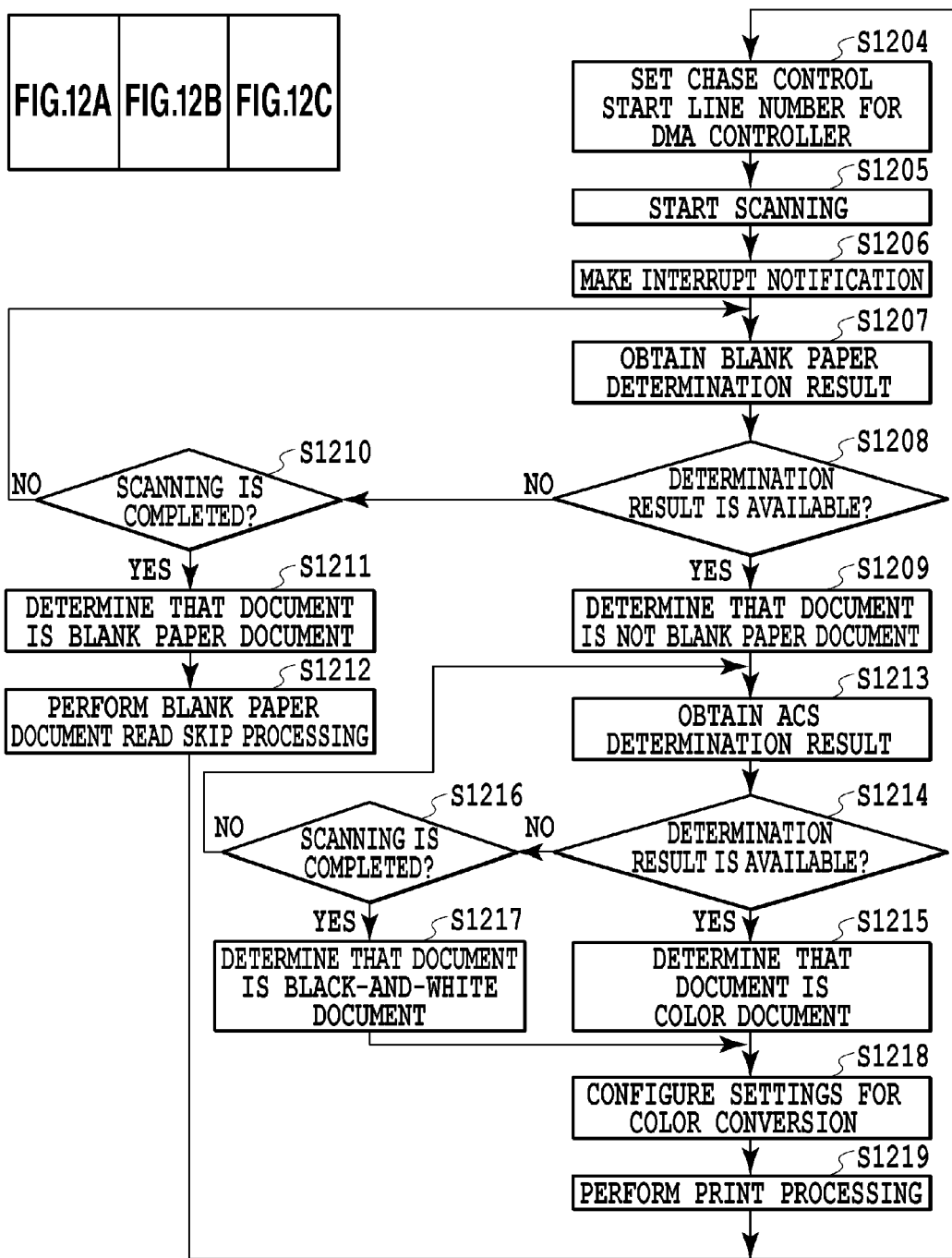

COPIER AND METHOD IN WHICH PRINT PROCESSING PROCEEDS PRIOR TO STORING ALL READ IMAGE DATA EXCEEDING PREDETERMINED SIZE WHEN ACS IS SELECTED

BACKGROUND OF THE INVENTION

Field of the Invention

The present invention relates to an image processing apparatus and an image processing method capable of copying a document.

Description of the Related Art

In a copying operation of a copier, the copier performs processing of storing image data read from a scanner unit in memory included in the copier and printing the stored image data. In this case, generally, the copier waits until entire image data of one page is stored in the memory and then starts the print processing of the stored image data of one page, i.e. the copier starts the print processing after the entire image data of one page is stored in the memory.

However, in order to increase the speed of copying operation, it is desirable to perform control (hereafter referred to as chase control) of starting the print processing of the image data stored in the memory before the completion of the storing of the entire image data of one page from the scanner unit to the memory. Japanese Patent Laid-Open No. 2004-266513 describes this chase control.

However, no chase control has been performed in copying utilizing ACS (auto color select) determination processing, i.e. processing of determining whether image data of one page is color image data or black-and-white image data.

SUMMARY OF THE INVENTION

An apparatus according to the present invention is an apparatus including: a reading unit configured to sequentially read a read target region from a read start position; a determination unit configured to determine whether image data obtained by the reading is color image data or black-and-white image data; a storage unit configured to sequentially store the image data obtained by the reading; a control unit configured to start output of the image data stored in the storage unit even if image data corresponding to the entire read target region has not been stored in the storage unit, in a case where the control unit detects that a size of the image data stored in the storage unit exceeds a predetermined size and that a determination result of the determination unit is made available.

In the present invention, chase control can be performed in copying utilizing ACS determination processing.

Further features of the present invention will become apparent from the following description of exemplary embodiments (with reference to the attached drawings).

BRIEF DESCRIPTION OF THE DRAWINGS

FIG. 6 is a diagram showing the relationship of FIGS. 6A and 6B;

FIGS. 6A and 6B are a flowchart showing an operation of the chase control utilizing the ACS determination processing in Embodiment 1;

FIG. 7 is a diagram showing the relationship of FIGS. 7A and 7B;

FIG. 11 is a diagram showing the relationship of FIGS. 11A and 11B;

FIG. 12 is a diagram showing the relationship of FIGS. 12A, 12B and 12C;

FIGS. 12A to 12C are a flowchart showing an operation of the chase control utilizing the ACS determination processing and the blank paper determination processing in Embodiment 4.

DESCRIPTION OF THE EMBODIMENTS

Embodiments of the present invention are described below by using the drawings.

Embodiment 1

Figure 1:
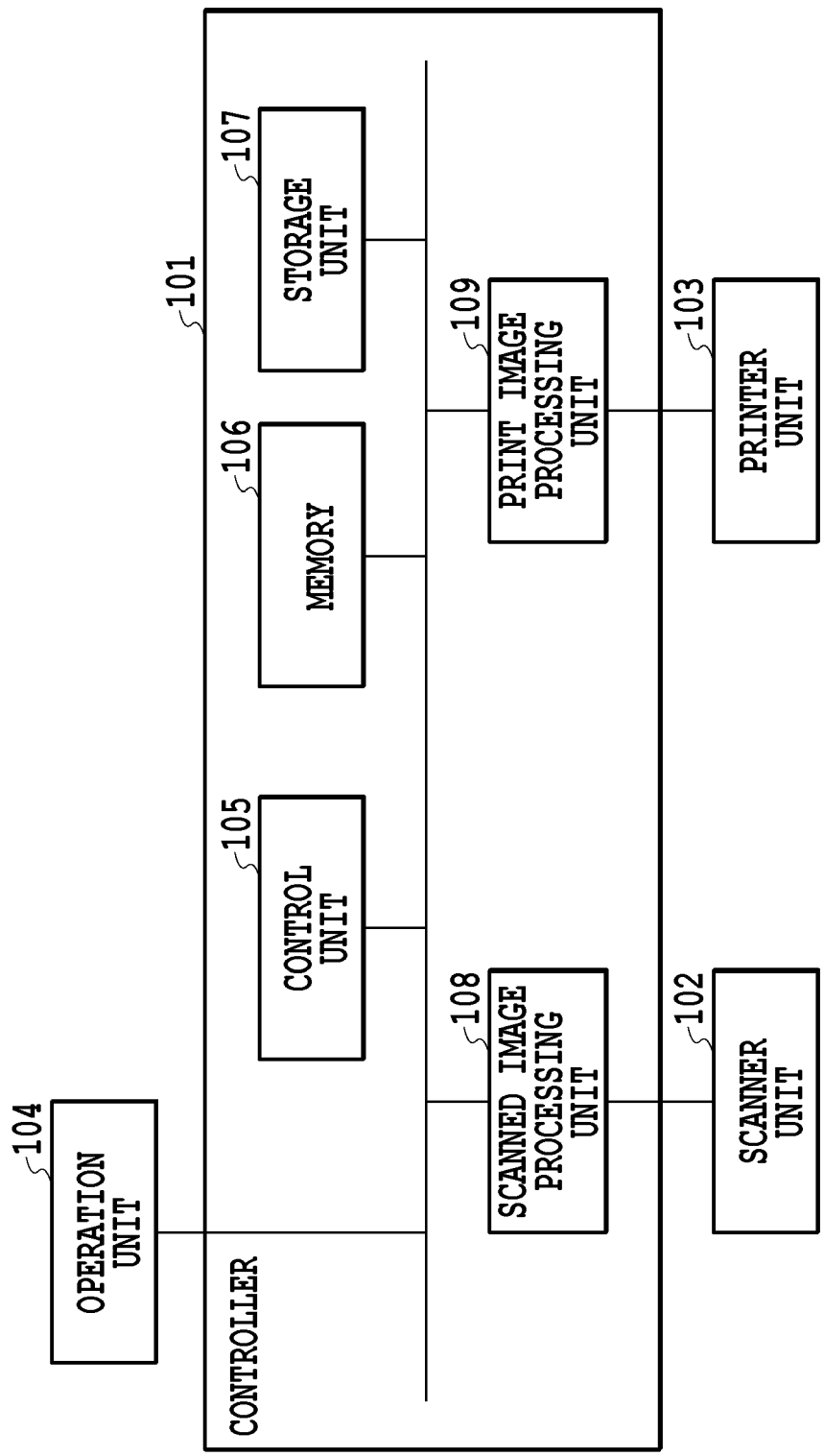
FIG. 1 is a block diagram of a copier in Embodiment 1.

FIG. 1 is a block diagram showing an example of a configuration of a copier in Embodiment 1 of the present invention. The copier includes a controller 101, a scanner unit 102, a printer unit 103, and an operation unit 104. The controller 101 includes a control unit 105, memory 106, a storage unit 107, a scanned image processing unit 108, and a print image processing unit 109. The controller 101 is connected to the scanner unit 102 which is an image input device, the printer unit 103, and the operation unit 104 and performs input and output of image data and control information.

The scanner unit 102 can generate scanned image data of an document by scanning the document. The scanning of the document can be performed on a platen (document table) or by using an ADF (auto document feeder). Moreover, the scanned image data is sent to the scanned image processing unit 108. The printer unit 103 prints the image data.

The operation unit 104 receives operation instructions from a user to the copier and displays a display screen. For example, the user can give instructions for copy settings shown below from the operation unit 104.

(1) Number of copies to be printed
(2) Size of the document
(3) Variable magnification
(4) Color mode (color, black-and-white, and ACS determination)
(5) Image combining (form image, page number, copy number, pattern image, two-dimensional code, and the like)
(6) Blank paper removable
(7) Rotation The control unit 105 controls operations of the units of the copier. The control unit 105 includes a CPU (Central Processing Unit) (not illustrated). The memory 106 temporarily stores the image data. The storage unit 107 is a HDD or the like and stores the image data.

Figure 2:
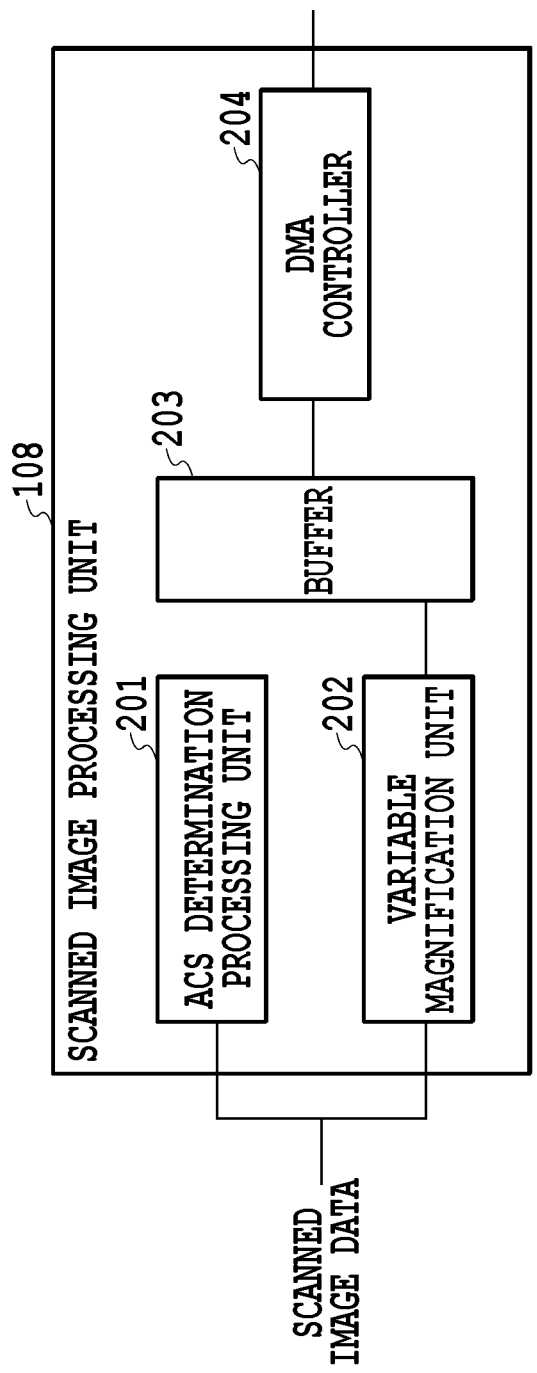
FIG. 2 is a block diagram of a scanned image processing unit in Embodiment 1.

FIG. 2 is a diagram showing an example of a configuration of the scanned image processing unit 108. The scanned image processing unit 108 includes an ACS determination processing unit 201, a variable magnification unit 202, a buffer 203, and a DMA controller 204.

Figure 3:
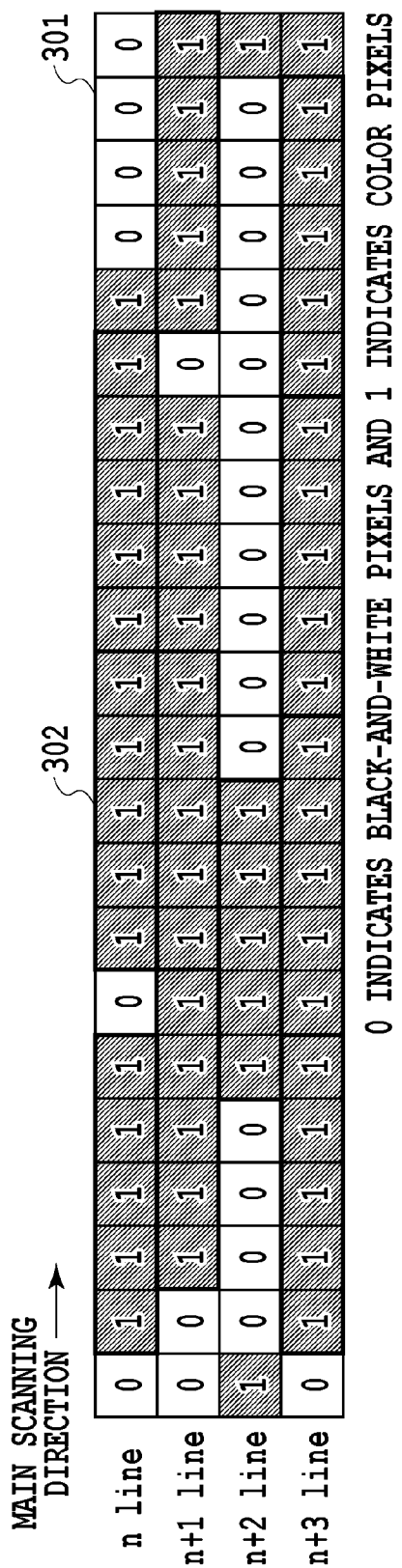
FIG. 3 is a view for explaining an outline of ACS determination processing.

The ACS determination processing unit 201 determines whether the scanned image data is color image data or black-and-white image data. FIG. 3 is a view for explaining an outline of processing performed by the ACS determination processing unit 201. First, in ACS determination processing, the ACS determination processing unit 201 determines whether each of pixels included in the scanned image data is a color pixel or a black-and-white pixel, for each line. A well-known technique can be used to determine whether the pixel is a color pixel or a black-and-white pixel. For example, determination in which a pixel with saturation of a certain threshold value or more is determined to be a color pixel and a pixel with saturation below the threshold value is determined as a black-and-white pixel is well known. In the example of FIG. 3, pixels 301 indicated by 0 are pixels which are determined to be black-and-white pixels by the ACS determination processing unit 201. Meanwhile, pixels 302 indicated by 1 are pixels determined to be color pixels by the ACS determination processing unit 201.

After completing the determination of the pixels in one line, the ACS determination processing unit 201 determines whether the number of contiguous color pixels in the line subjected to the determination is equal to or greater than a certain threshold value (for example, five). In a case where the number of contiguous color pixels is equal to or greater than the certain threshold value, the ACS determination processing unit 201 determines that the line is a color line. Meanwhile, in a case where the number of contiguous color pixels is smaller than the certain threshold value, the ACS determination processing unit 201 determines that the line is a black-and-white line. This determination is performed also for subsequent lines. In the example of FIG. 3, five or more color pixels are contiguously arranged as shown by the bold frames in each of the lines from the n line to the n+3 line. Accordingly, these lines are determined to be color lines.

Then, in a case where the number of contiguous color lines becomes equal to or greater than a certain threshold value (for example, four), the ACS determination processing unit 201 determines that the scanned image data of a target page is color image data, and terminates the ACS determination processing at that point. Meanwhile, in a case where the number of contiguous color lines does not reach the certain threshold value, the ACS determination processing unit 201 performs determination for subsequent lines. In the example of FIG. 3, the lines from the n line to the n+3 line are color lines and four or more color lines are contiguously arranged. Accordingly, on determining that the n+3 line is a color line, the ACS determination processing unit 201 determines that the scanned image data of the target page is color image data.

Meanwhile, in a case where a phenomenon that the number of contiguous color lines becomes equal to or greater than the certain threshold value (for example, four) does not occur at all in the scan image data of one page, the ACS determination processing unit 201 determines that the scanned image data of this page is black-and-white image data and terminates the ACS determination processing.

As described above, in the ACS determination processing, the processing is completed relatively quickly in the case where the scanned image data is determined to be color image data. However, the processing is completed relatively slowly in the case where the scanned image data is determined to be black-and-white image data. This is because the determination needs to be performed for all of the lines in the case where the scanned image data is determined to be black-and-white image data.

In a case where a variable magnification other than 100% is set, the variable magnification unit 202 performs a variable magnification processing on the scanned image data according to the set variable magnification and sends the image data subjected to variable magnification to the buffer 203. Meanwhile, in a case where the variable magnification of 100% is set, the variable magnification unit 202 performs no variable magnification processing and sends the received scanned image data to the buffer 203 as it is. Note that the variable magnification unit 202 and the ACS determination processing unit 201 are parallel to each other and both units can perform processes simultaneously. Note that, although FIG. 2 shows an example in which the scanned image processing unit performs, on the scanned image data, the variable magnification processing as the image processing, other types of image processing may be performed. For example, the scanned image processing unit can perform, on the scanned image data, various types of image processing such as MTF (Modulation Transfer Function) correction and gamma correction corresponding to scanner characteristics.

Every time image data of one line is stored in the buffer, the DMA controller 204 sends the stored image data to the memory 106 through DMA (Direct Memory Access). In the following description, processing from the scanning by the scanner unit 102 to the storage of the image data in the memory via the scanned image processing unit 108 (Note that the ACS determination processing is not included) is referred to as scan processing.

Figure 4:
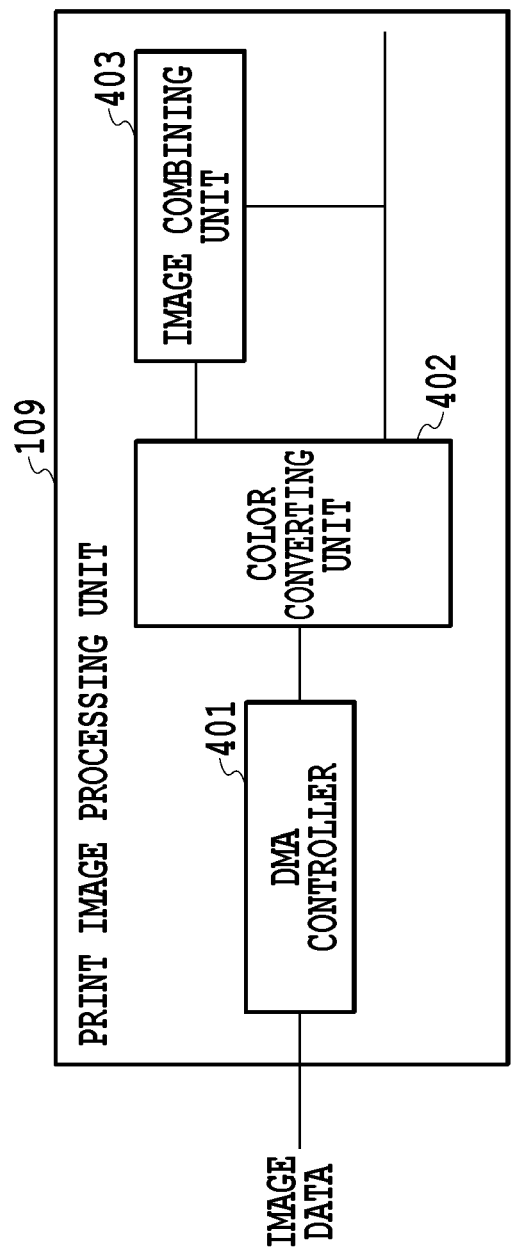
FIG. 4 is a block diagram of a print image processing unit in Embodiment 1.

FIG. 4 is a block diagram showing a configuration of the print image processing unit 109. As shown in FIG. 4, the print image processing unit 109 includes a DMA controller 401, a color converting unit 402, and an image combining unit 403. The DMA controller 401 obtains the image data in the memory 106 and sends the image data to the color converting unit 402. The color converting unit 402 performs conversion from RGB to CMYK or conversion from RGB to K. Only in a case where the image combining is set, the image combining unit 403 combines set images such as a form image, a page number, a copy number, a pattern image, and a two-dimensional code, on the image subjected to color conversion.

Note that, in the following description, processing performed to the point where the printer unit 103 prints the image data in the memory 106 via the print image processing unit 109 (Note that the processing of image combining is not included. Moreover, this processing is processing in a case where the document is a color document) is referred to as print processing.

Next, description is given of chase control. In the chase control, the print processing needs to be performed in such a way as not to pass the scan processing. To understand the necessity of this operation, assume the following case. Specifically, assume a case where the scan processing is performed very slowly and the print processing is performed very quickly. Moreover, assume that the chase control is started at a point where image data of the first half of the image data of one page is stored in the memory 106. In such a case, only a small part of image data of the latter half is stored in the memory 106 at the point where the print processing for the image data of the first half is completed. Since the print processing for this small part of image data is instantaneously performed, there occurs a situation where no image data is stored in the memory even though the print processing for the image data of one page is not completed yet. In such a situation, the printer unit has to temporarily stop in the middle of the printing of the image data of one page. However, designing a printer unit which can temporarily stop in the middle of printing is extremely difficult. Accordingly, it is necessary to start the chase control in such a way that the print processing does not pass the scan processing.

Figure 5:
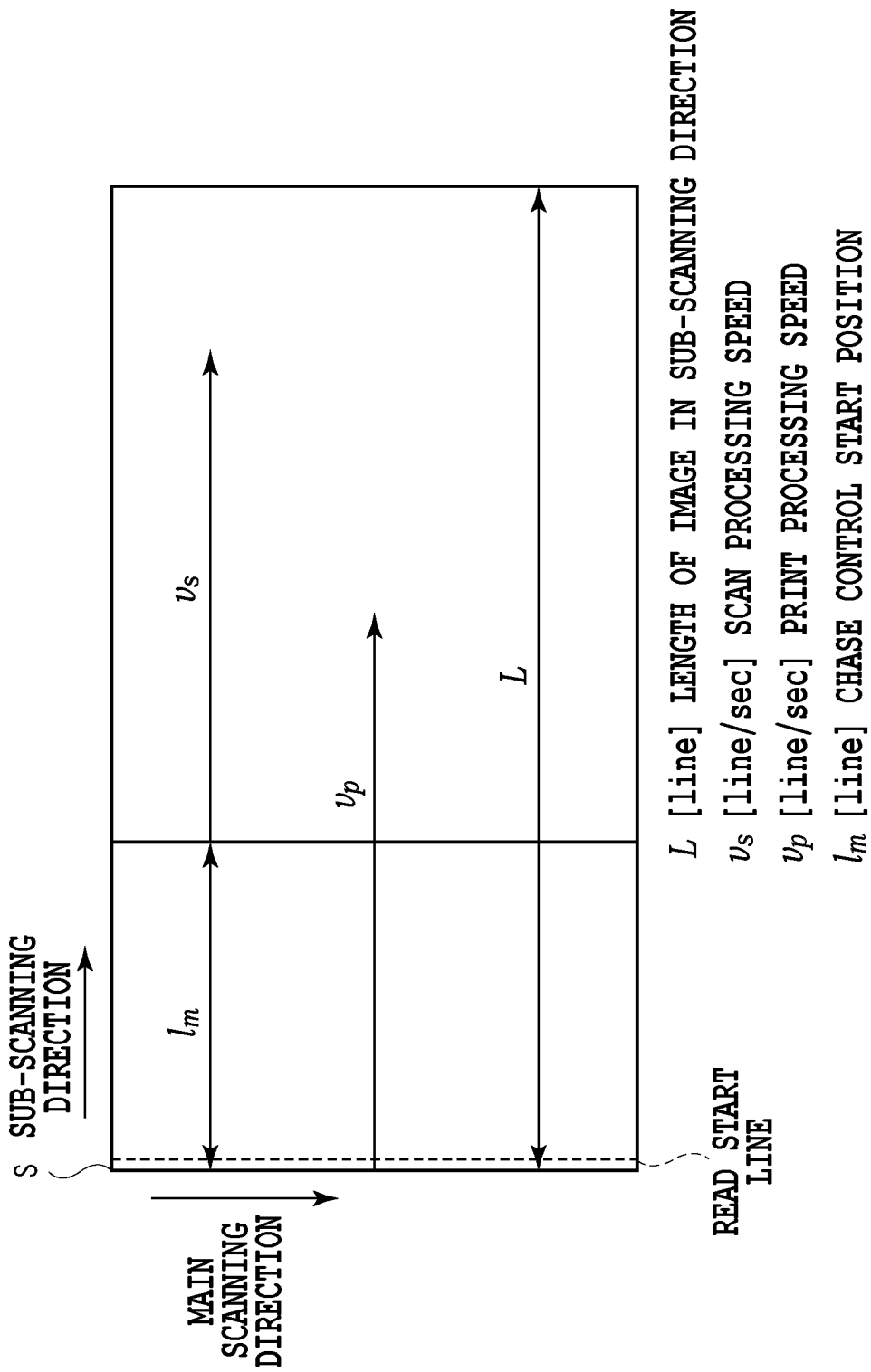
FIG. 5 is a view showing a start timing of chase control in Embodiment 1.

A method of determining a start timing of the chase control is described by using FIG. 5. FIG. 5 is a view showing an example of a read target region of the document. In FIG. 5, S represents a read start position. In the scan processing, first, a read start line including the read start position S and extending in a main scanning direction is read. Thereafter, the line to be read is sequentially shifted in a sub-scanning direction and subsequent lines are thereby sequentially read. In FIG. 5, L shows the length of the document in the sub-scanning direction (number showing how many lines extending in the main scanning direction exist in the sub-scanning direction). $V_s$ represents the speed of the scan processing and shows the number of lines which can be scan processed per second. Similarly, $V_p$ represents the speed of the print processing and shows the number of lines printed in the print processing per second. $l_m$ shows a start position of the chase control. The control unit 105 starts the chase control at a point where the image data of a $l_m$-th line is sent from the DMA controller 204 of the scanned image processing unit 108 to the memory. $l_m$ which is a predetermined number is obtained from the following formula.

$$l_m = \frac{v_p - v_s}{v_p} L$$

As is apparent from FIG. 5, it can be said that the image data obtained by the reading has a predetermined size at a position just short of the $l_m$-th line which is the chase control start position. The control unit 105 thus starts the chase control in a case where the image data stored in the memory exceeds the predetermined size. Note that the scan processing speed $V_s$ and the print processing speed $V_p$ change depending on the copy settings. For example, the scan processing speed $V_s$ and the print processing speed $V_p$ change depending on whether the color mode in the copy settings is set to the color image data or the black-and-white image data. Accordingly, the $l_m$ line which is the chase control start position also varies depending on whether the color mode in the copy settings is set to the color image data or the black-and-white image data. For example, the value of $l_m$ which is the chase control start position is larger in the case where the color mode is set to the color image data than in the case of the black-and-white image data. This is because the amount of information per pixel in the color image data is greater than that in the black-and-white image data and the time required for the scan processing is thus greater.

In order to execute the chase control using the thus-set chase control start position, the control unit 105 sets up the DMA controller 204 of the scanned image processing unit 108 in the following way. Specifically, the controller 105 sets $l_m$ for the DMA controller 204 in such a way that the DMA controller 204 sends an interrupt notification to the control unit 105 upon sending the scanned image data of $l_m$ lines to the memory 106. Upon receiving this interrupt notification from the DMA controller 204, the control unit 105 sends an instruction to start the chase control to the DMA controller 401 of the print image processing unit 109. Upon receiving this instruction to start the chase control, the DMA controller 401 starts the print processing.

Figure 6B:
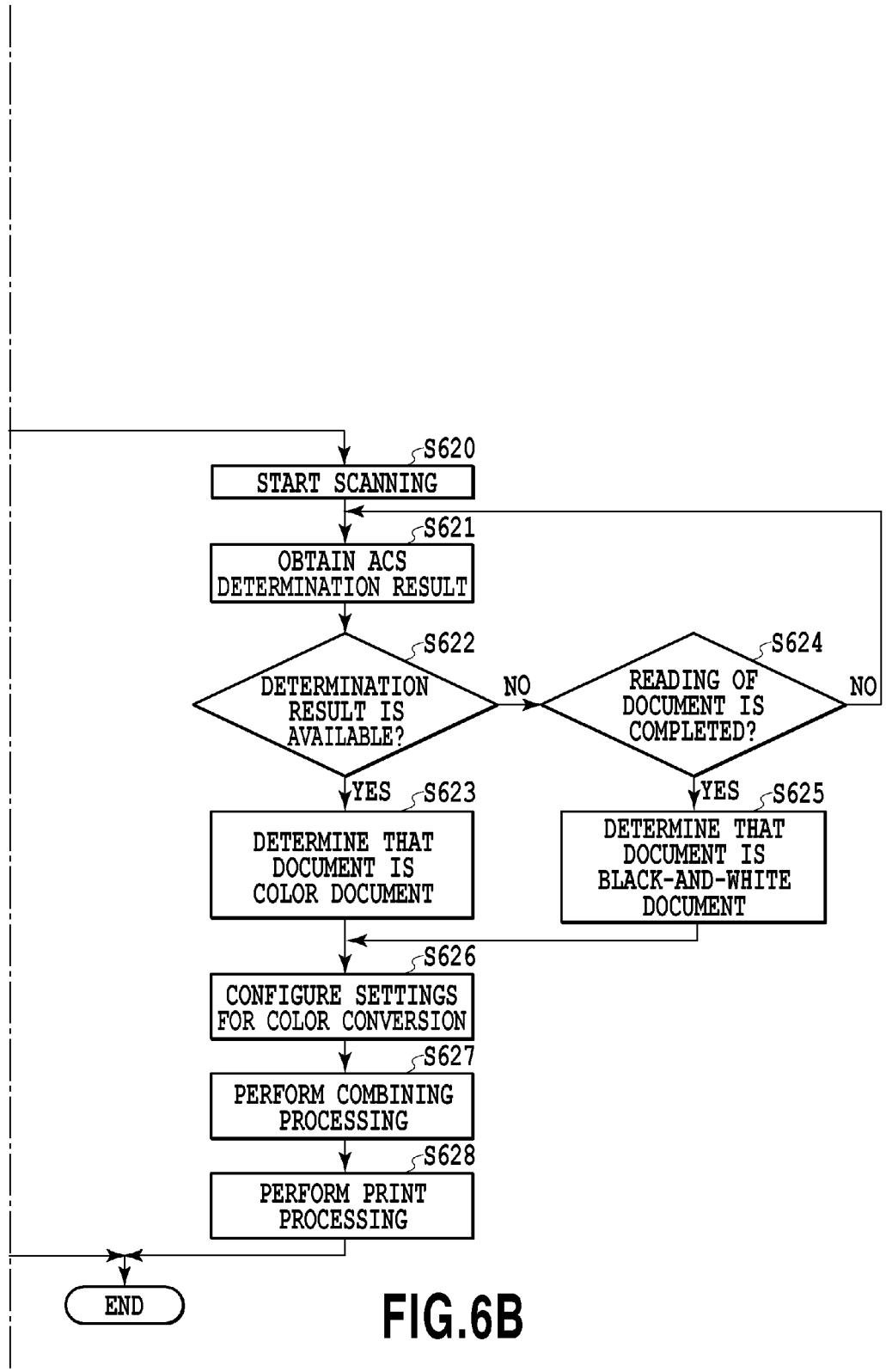

Next, the "chase control" performed in the case where the color mode is set to the ACS determination is described by using FIGS. 6A and 6B. FIGS. 6A and 6B are a flowchart of processing executed by the controller 101 of the copier in the embodiment. The processing shown in FIGS. 6A and 6B is implemented by the control unit 105 executing a control program stored in the memory 106 and the storage unit 107.

In a case where the user gives an instruction to execute copying from the operation unit 104, the control unit 105 receives the copy settings and a copy execution request from the operation unit 104 in step S601. In step S602, the control unit 105 sends the scanned image processing unit 108 the size of the document, the variable magnification, and the color mode which are set in the copy settings received in step S601.

In step S603, the control unit 105 determines whether to perform the chase control or not, on the basis of the copy settings received in step S601. For example, the control unit 105 determines to perform the chase control in a case where all of the following conditions are satisfied in the copy settings.

(1) The number of copies to be printed is one.
(2) The size of the document is one of a plurality of preset sizes (For example, A4, A3, LTR, and LGL).
(3) The variable magnification is 100%
(4) No image combining (form image, page number, copy number, pattern image, two-dimensional code, and the like) is set.
(5) No rotation is set.

In a case where the control unit 105 determines to perform the chase control in step S603, the processing proceeds to step S604. In step 604, the control unit 105 calculates a chase control start line number $l_m$ corresponding to the length (L) of the document, on the basis of the copy settings received in step S601 and the scan processing speed and the print processing speed corresponding to a print mode. Then, the control unit 105 sends the obtained value of $l_m$ to the DMA controller 204 of the scanned image processing unit 108. The control unit 105 thus sets up the DMA controller 204 of the scanned image processing unit 108 in such a way that the DMA controller 204 sends the interrupt notification to the control unit 105 upon sending the memory the image data of lines whose number is equal to the chase control start line number lm.

In step S605, the control unit 105 requests the scanner unit 102 to execute scanning. Then, the scanner unit 102 starts to scan the document. With the start of the scanning of the document, the scanned image data of the document is sent to the memory 106 via the scanned image processing unit 108 line by line. At this time, the aforementioned image processing such as the MTF correction and the gamma correction is also performed. Note that, as described above, since the variable magnification in the case where the processing proceeds to step S605 is 100%, the variable magnification unit does nothing. Moreover, the ACS determination processing unit 201 performs the ACS determination on each of the lines of the scanned image data as described above.

In step S606, the DMA controller 204 of the scanned image processing unit 108 sends the memory 106 the scanned image data of lines whose number is equal to the chase control start line number $1_m$ set in step S604, and then makes the interrupt notification to the control unit 105.

In step S607, the control unit 105 obtains the determination result of ACS determination processing from the scanned image processing unit 108 upon detecting the interrupt notification from the DMA controller 204. Note that the result of ACS determination is made available at the point of step S607 in some cases but not in others. The case where the result of ACS determination is made available is the case where the number of contiguous color lines becomes equal to or greater than the threshold value as described above before the number of read lines reaches the chase control start line number $1_m$. In such a case, the control unit 105 can obtain a determination result in which the scanned image data is determined to be color image data, as the result of ACS determination.

In the case where the control unit 105 determines that the ACS determination result is made available in step S608, i.e. in the case where the determination result of ACS determination processing is color image data, the control unit 105 causes the processing to proceed to step S609 and determines that the document is a color document. Since the document is confirmed to be a color document in step S609, the control unit 105 causes the processing to proceed to step S612.

Meanwhile, in the case where the result of ACS determination is not made available yet in step S608, the control unit 105 causes the processing to proceed to step S610. In step S610, the control unit 105 determines whether the scanning of the document is completed. In a case where the control unit 105 determines that the scanning is not completed in step S610, the control unit 105 waits for a certain time and then causes the processing to proceed to step S607 to obtain the ACS determination result from the ACS determination processing unit 201 again. Meanwhile, in a case where the control unit 105 determines that the scanning is completed in step S610, the control unit 105 causes the processing to proceed to step S611. The processing proceeding to step S611 means that the scanning of the document is completed and that the scanned image is not determined to be a color image. Accordingly, in step S611, the control unit 105 determines that the document is a black-and-white document. The control unit causes the processing to proceed to step S612 after the document is confirmed to be a color image or a black-and-white image in step S609 or step S611 as described above. In other words, in the embodiment, even if the interrupt notification for the chase control is made, the chase control is not performed until the result of ACS determination is confirmed.

In step S612, the control unit 105 configures settings for color conversion. Specifically, in the case where the document is confirmed to be a color document in step S609, the control unit 105 sets up the print image processing unit 109 for the conversion from RGB to CMYK in step S612. Meanwhile, in the case where the document is confirmed to be a black-and-white document in step S609, the control unit 105 sets up the print image processing unit 109 for the conversion from RGB to K in step S612.

In step S613, the control unit gives an instruction to start the print processing. Starting the print processing means that the control unit 105 makes an interrupt notification to the DMA controller 401 of the print image processing unit 109. Upon receiving this interrupt notification, the DMA controller 401 of the print image processing unit 109 reads the scanned image data stored in the memory 106 line by line and sends the scanned image data to the color converting unit 402. In other words, the print processing based on the chase control is performed. The color converting unit 402 performs color conversion on the scanned image data in units of line, according to the aforementioned settings in step S612, and sequentially sends color conversion results to the printer unit 103. The printer unit 103 prints the color conversion results sent from the print image processing unit 109 on a print sheet. As described above, the print image processing unit 109 outputs lines subjected to the image processing to the printer unit 103 without storing lines of one page of image data.

Next, description is given of processing performed in a case where the control unit 105 determines that no chase control is to be performed in step S603. In a case where the control unit 105 determines that no chase control is to be performed in step S603, the control unit causes the processing to proceed to step S620.

In step S620, the control unit 105 requests the scanner unit 102 to execute scanning. Then, the scanner unit 102 starts to scan the document. With the start of the scanning of the document, the scanned image data of the document is sent to the memory 106 via the scanned image processing unit 108 line by line. At this time, the aforementioned image processing such as the MTF correction and the gamma correction is also performed. Note that, in a case where the variable magnification is set, the scanned image data is subjected to variable magnification processing according to the variable magnification.

In step S621, the control unit 105 receives the result of ACS determination. Processing similar to that in steps S608 to S611 is performed in steps S622 to S625.

Next, in step S626, after the image data of one page is stored, the control unit 105 performs color conversion processing similar to that in step S612, according to the type of the document confirmed in step S623 or step S625. Next, in step S627, in a case where the setting for combining is made in step S601, an image corresponding to the setting in step S601 is combined with the scanned image data. Then, the print processing is performed in step S628. Since the print processing is similar to that described in step S613, description thereof is omitted.

As described above, in the embodiment, the chase control can be performed also in copying utilizing the ACS determination processing.

Embodiment 2

Next, Embodiment 2 is described. In Embodiment 2, description is given of an example in which the chase control start line number is changed depending on the result of ACS determination processing. Since a configuration of a copier in Embodiment 2 is similar to that described in Embodiment 1, description thereof is omitted.

Figure 7A:
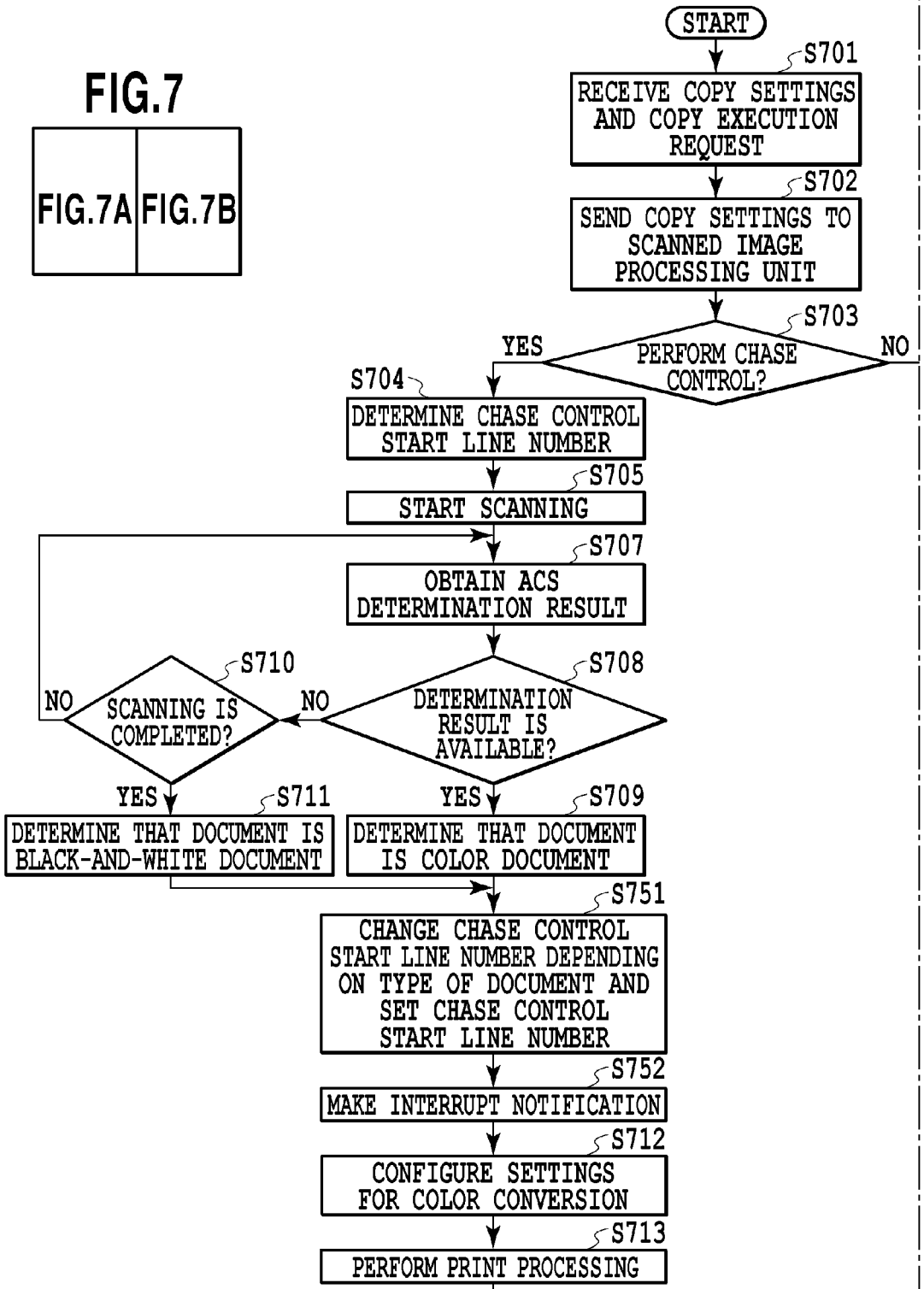
FIGS. 7A and 7B are a flowchart showing an operation of chase control utilizing the ACS determination processing in Embodiment 2.
Figure 7B:
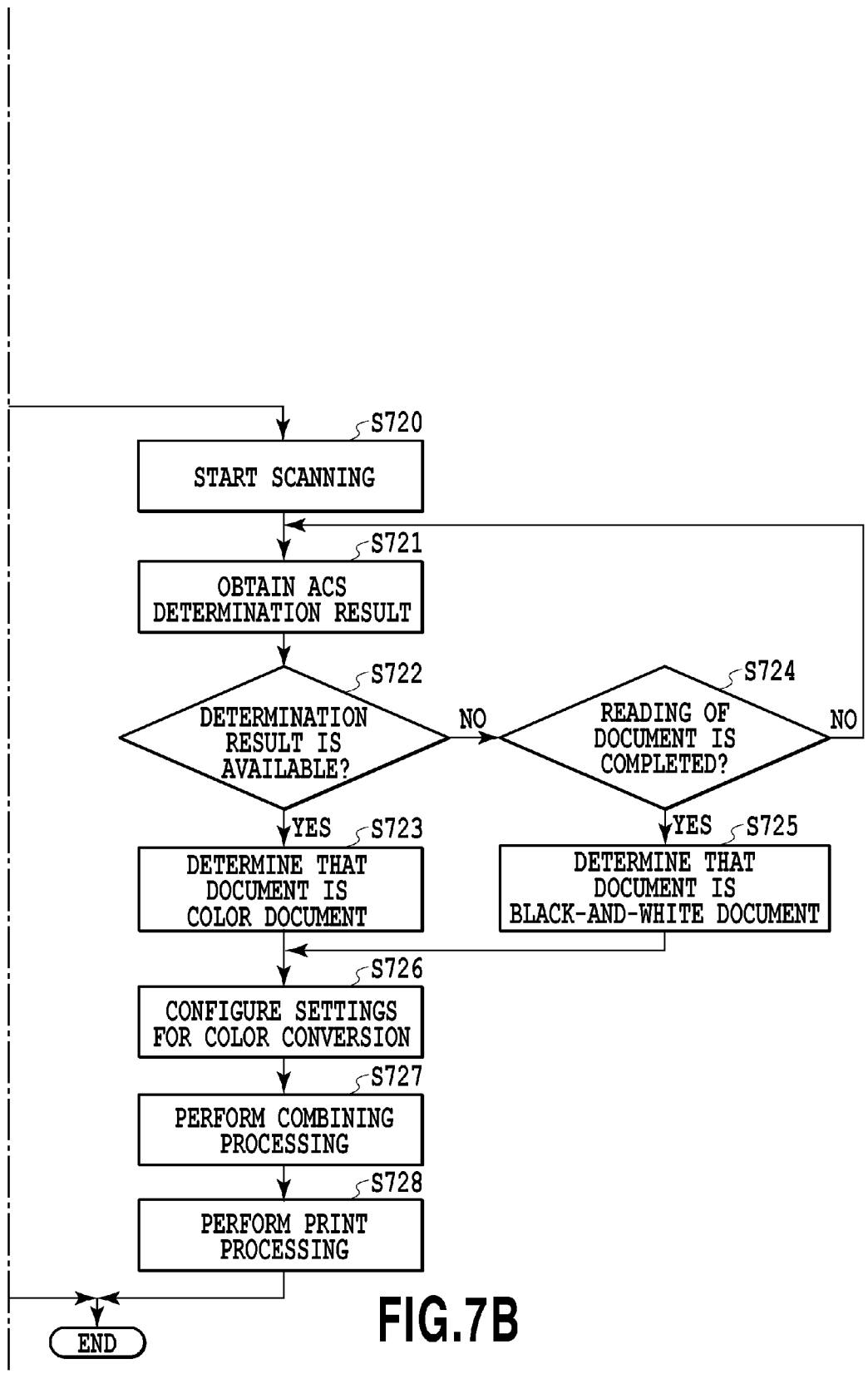

FIGS. 7A and 7B a flowchart showing an operation of a chase control utilizing the ACS determination processing in Embodiment 2. Since steps S701 to S703 and steps S707 to S713 of FIGS. 7A and 7B are similar to steps S601 to S603 and steps S607 to S613 of FIGS. 6A and 6B, description thereof is omitted. Embodiment 2 is different from Embodiment 1 in that interruption processing corresponding to step S606 of FIG. 6A is omitted, processing in step S704 is changed, and steps S751 and S752 are newly added after steps S709 and S711, respectively.

As shown in the flowchart of FIGS. 7A and 7B, the control unit 105 of Embodiment 2 determines the chase control start line number in step S704. However, in the embodiment, the control unit 105 does not set the chase control start line number for the DMA controller 204 at the point of step S704. In step S705, the control unit 105 requests the scanner unit 102 to execute scanning. Thereafter, the ACS determination processing is performed in step S707 to S711.

Next, in step S751, the control unit 105 changes the chase control start line number determined in step S704, depending on the type of document determined in step S709 or S711. Then, the control unit 105 sets the changed chase control start line number for the DMA controller 204.

As described above, the scan processing speed $V_s$ and the print processing speed $V_p$ change depending on weather the color mode in the copy settings is set to color image data or black-and-white image data. Accordingly, in the embodiment, the chase control start line number is changed depending on whether the result of ACS determination is color image data or black-and-white image data. Specifically, the control unit 105 performs control in such a way that, in a case where the result of ACS determination processing is color image data, the value of the chase control start line number is set to be larger than that in the case of black-and-white image data.

In step S752, the DMA controller 204 of the scanned image processing unit 108 sends the memory 106 scanned image data of lines whose number is equal to the chase control start line number $l_m$ set in step S751, and then makes interrupt notification to the control unit 105. The processing hereafter is the same as that of Embodiment 1.

As described above, in the embodiment, the chase control can be performed at an appropriate timing depending on the color mode of the document, by setting the chase control start line number on the basis of the result of ACS determination.

Embodiment 3

In Embodiments 1 and 2, description is given of the chase control performed in the case where the ACS determination processing is performed. Instead of the ACS determination processing in which whether the scanned image data is color image data or black-and-white image data is determined, blank paper determination processing is performed as a method of determining the type of document in the scan processing in some cases. The blank paper determination processing is processing of determining whether the read document is blank paper (i.e. paper with nothing printed thereon). A method in which image data of an document determined to be blank paper is deleted to prevent wasteful printing and suppress consumption of paper and toner is conceived. However, no chase control is performed in such blank paper determination processing. Accordingly, in the embodiment, description is given of a chase control performed in the case where the blank paper determination processing is performed.

Figure 8:
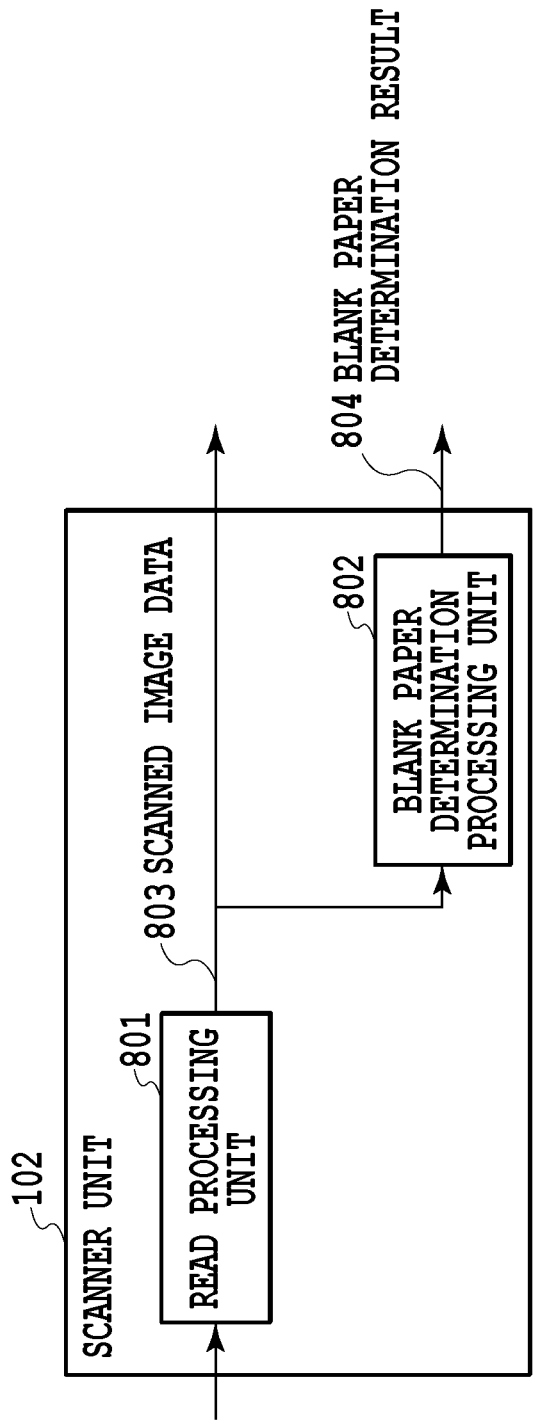
FIG. 8 is a block diagram showing a configuration example of a scanner unit in Embodiment 3.

A configuration of the scanner unit 102 in the embodiment is described by using FIG. 8. FIG. 8 is a view showing an internal configuration of the scanner unit 102. In FIG. 8, the scanner unit 102 has a read processing unit 801 and a blank paper determination processing unit 802. The read processing unit 801 reads the document and performs processing of converting the read image to digital data. The blank paper determination processing unit 802 receives scanned image data 803 read by the read processing unit 801 as an input and determines whether the read scanned image data is blank paper or not. The scanner unit 102 outputs the scanned image data 803 outputted by the read processing unit 801 and a blank paper determination result 804 obtained by the blank paper determination processing unit 802, for the read document image. The scanned image data and the blank paper determination result outputted from the scanner unit 102 are transmitted to the controller 101.

Figure 9:
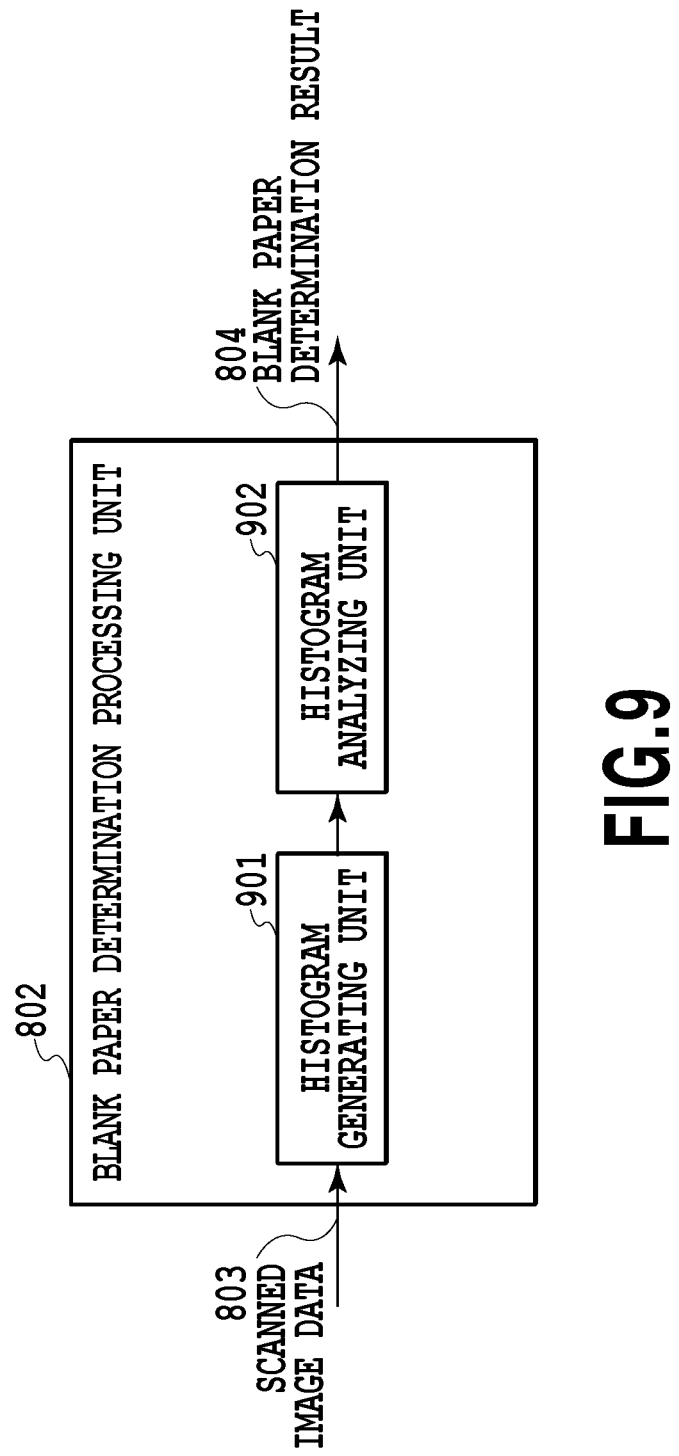
FIG. 9 is a block diagram showing a configuration example of a blank paper determination processing unit in Embodiment 3.

FIG. 9 is a view showing an internal configuration of the blank paper determination processing unit 802 in the embodiment. The blank paper determination processing unit 802 includes a histogram generating unit 901 and a histogram analyzing unit 902. The blank paper determination processing unit 802 is assumed to be connected to a not-illustrated register and to hold control parameters and processing results. Writing to the register is performed by the control unit 105 and the blank paper determination processing unit 802 and the blank paper determination processing unit 802 operates by reading the control parameters set in the register.

Figure 10A:
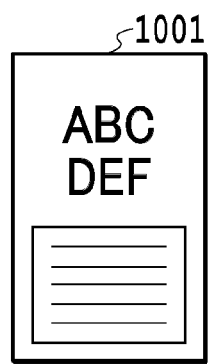
FIGS. 10A to 10D show examples of histograms for an document which is not blank paper and an document which is blank paper.
Figure 10B:
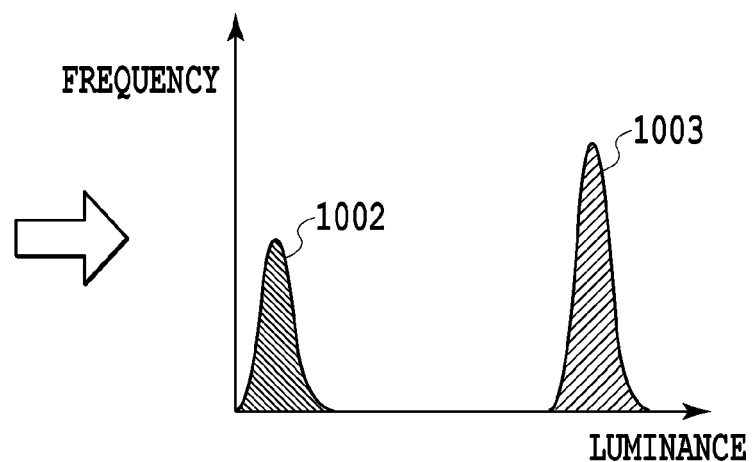
Figure 10C:
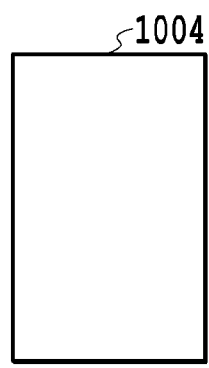
Figure 10D:
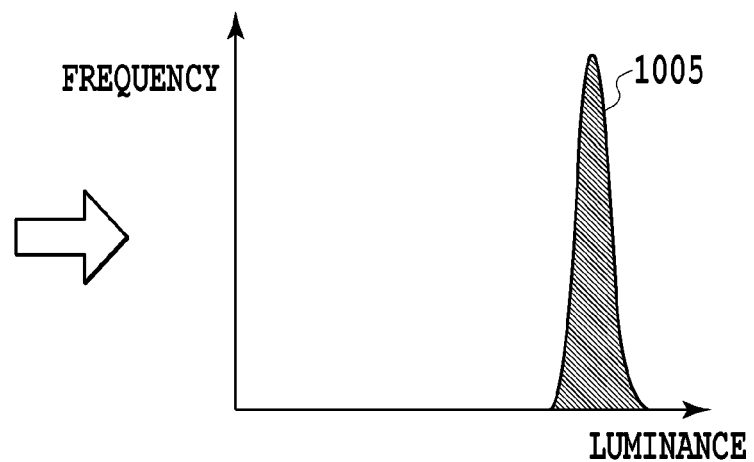

The histogram generating unit 901 generates a histogram from the scanned image data 803. The scanned image data 803 read by the read processing unit 801 is inputted to the histogram generating unit 901 as read by the read processing unit 801 and the generation of the histogram is performed in real time. The histogram analyzing unit 902 analyzes the characteristics of the histogram generated by the histogram generating unit 901 and determines whether the document is blank paper or not. An example of an operation of the histogram analyzing unit 902 is described by using FIGS. 10A to 10D. For example, FIG. 10B shows a histogram generated by the histogram generating unit 901 for an document 1001 which is not blank paper as shown in FIG. 10A. Meanwhile, FIG. 10D shows a histogram generated by the histogram generating unit 901 for an document 1004 which is blank paper as shown in FIG. 10C. A peak 1002 corresponding to portions of characters and the like in the document and a peak 1003 corresponding to background portions are detected in the histogram of FIG. 10B for the document 1001 which is not blank paper. Meanwhile, only the peak 1005 corresponding to the background portions is detected in the histogram of FIG. 10D for the document 1004 which is blank paper. The histogram analyzing unit 902 determines whether the scanned image data is blank paper or not by analyzing such characteristics of the histogram.

Moreover, the histogram analyzing unit 902 can perform the blank paper determination processing as follows. In the middle of the document reading by the read processing unit 801, the histogram analyzing unit 902 obtains, from the histogram generating unit 901, a histogram of the scanned image data which has been already read up to that time, and performs the blank paper determination processing. In this case, the histogram analyzing unit 902 determines that the scanned image data is not blank paper at a point where the peak 1002 corresponding to the portions of characters and the like in the document exceeds a certain threshold value, even in the middle of the document reading. Meanwhile, in a case where the peak 1002 corresponding to the portions of characters and the like in the document does not exceed the threshold value and only the peak 1005 corresponding to the background portions is detected until the completion of the document reading, the histogram analyzing unit 902 determines that the scanned image data is blank paper. As described above, in the blank paper determination processing, the processing is completed relatively quickly in the case where the scanned image data is determined not to be blank paper while the processing is completed relatively slowly in the case where the scanned image data is determined to be blank paper. This is because, in order to determine that the scanned image data is blank paper, the determination has to be performed by using the histogram obtained in a state where the entire scanned image data is read.

Since other configurations of the copier are similar to those described in Embodiment 1, description thereof is omitted herein.

Figure 11A:
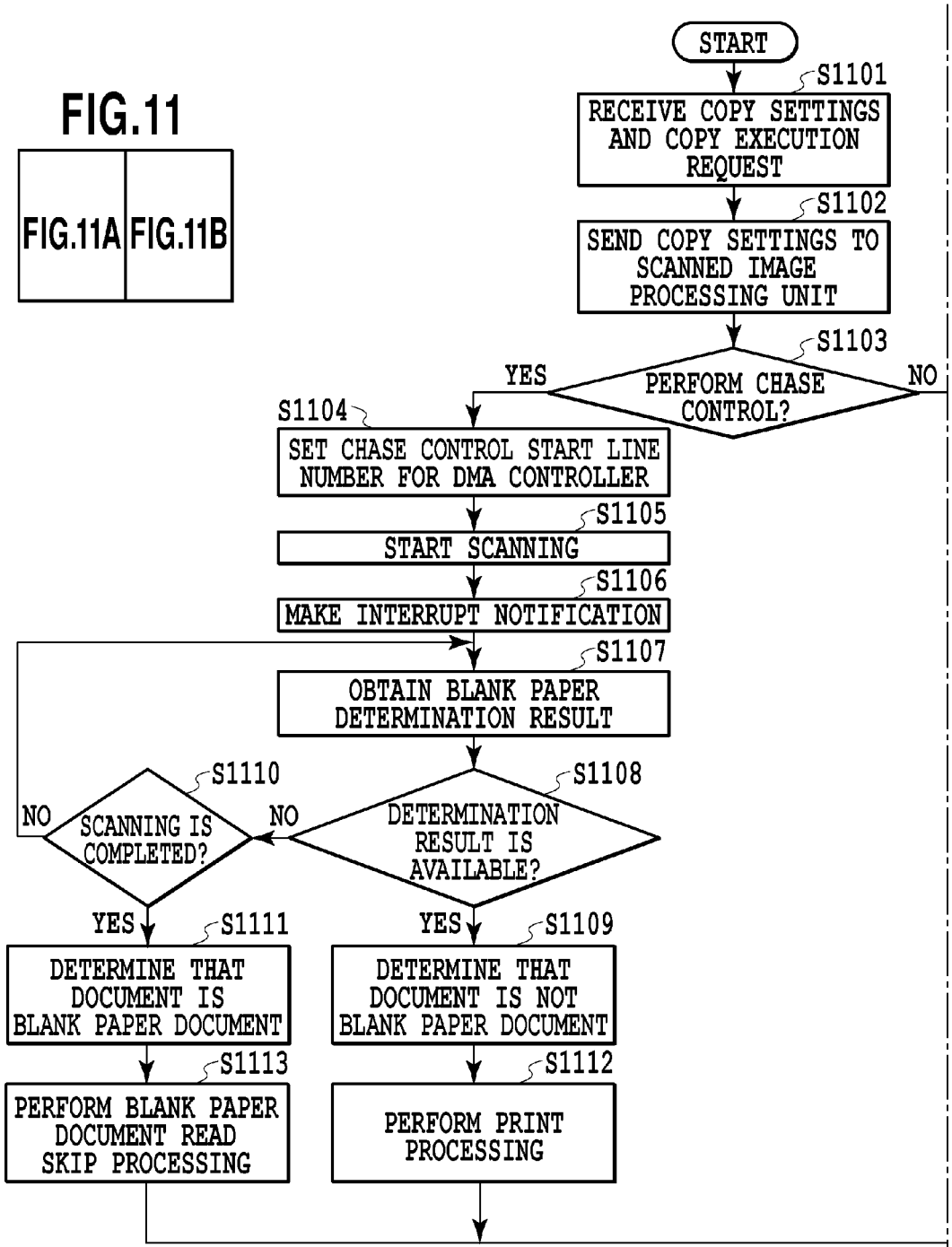
FIGS. 11A and 11B are a flowchart showing an operation of the chase control utilizing blank paper determination processing in Embodiment 3.
Figure 11B:
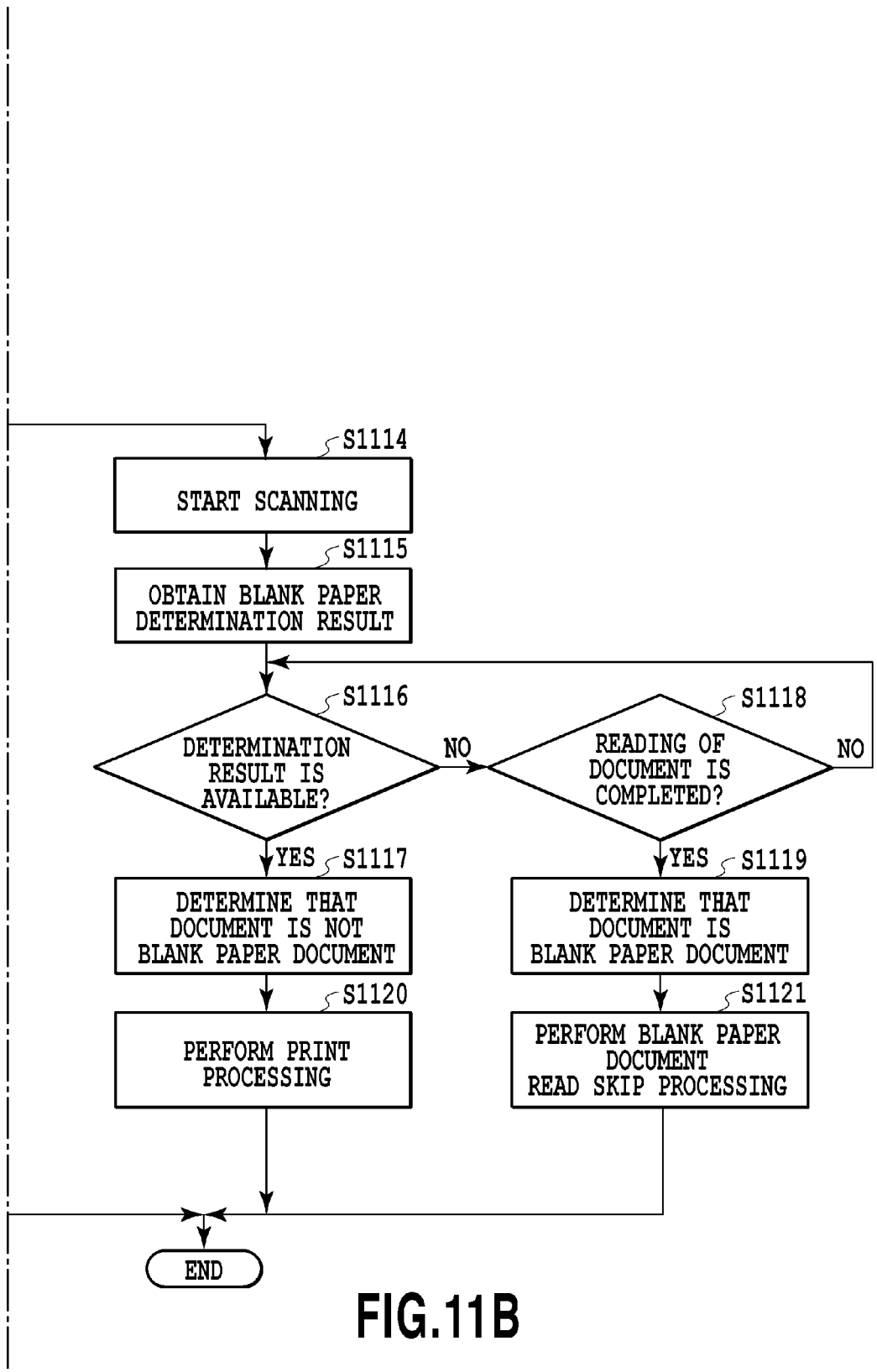

Next, the "chase control" performed in a case where a blank paper removing function is set is described by using FIGS. 11A and 11B. FIGS. 11A and 11B are a flowchart of processing executed by the controller 101 of the copier in the embodiment. The processing shown in FIGS. 11A and 11B is implemented by the control unit 105 executing a control program stored in the memory 106 and the storage unit 107.

Since processing in steps S1101 to S1104 are similar to that described in steps S601 to S604 in Embodiment 1, description thereof is omitted.

In steps S1105, the control unit 105 requests the scanner unit 102 to execute scanning. Then, the scanner unit 102 starts to scan the document. With the start of the scanning of the document, the scanned image data of the document is sent to the histogram generating unit 901 of the scanner unit 102 and the histogram is generated. Moreover, with the start of the scanning of the document, the scanned image data of the document is sent to the memory 106 via the scanned image processing unit 108 line by line. Note that, as described above, since the variable magnification in the case where the processing proceeds to step S1105 is 100%, the variable magnification unit does nothing.

In step S1106, the DMA controller 204 of the scanned image processing unit 108 sends the memory 106 the scanned image data of lines whose number is equal to the chase control start line number $l_m$ set in step S1104, and then makes the interrupt notification to the control unit 105.

In step S1107, the control unit 105 obtains the determination result of blank paper determination processing from the blank paper determination processing unit 802 of the scanner unit 102 upon detecting the interrupt notification from the DMA controller 204. Note that the result of blank paper determination is made available at the point of step S1107 in some cases but not in others. The case where the result of blank paper determination is made available is the case where the peak corresponding to the portions of characters and the like in the document is equal to or greater than the threshold value as described above in the histogram of the scanned image data of the chase control start line number $l_m$. In such a case, the control unit 105 can obtain a determination result in which the scanned image data is determined not to be blank paper, as the result of blank paper determination.

In the case where the control unit 105 determines that the blank paper determination result is made available in step S1108, i.e. in the case where the determination result of blank paper determination processing is not blank paper image, the control unit 105 causes the processing to proceed to step S1109 and determines that the document is not a blank paper document. Since the document is confirmed not to be a blank paper document in step S1109, the control unit 105 causes the processing to proceed to step S1112.

In step S1112, the control unit gives instruction to start the print processing. Starting the print processing means that the control unit 105 makes an interrupt notification to the DMA controller 401 of the print image processing unit 109. Upon receiving this interrupt notification, the DMA controller 401 of the print image processing unit 109 reads the scanned image data stored in the memory 106 line by line and sequentially sends the scanned image data to the printer unit 103. In other words, the print processing based on the chase control is performed. The printer unit 103 prints the image data sent from the print image processing unit 109 on a print sheet.

Meanwhile, in the case where the result of blank paper determination is not made available yet in step S1108, the control unit 105 causes the processing to proceed to step S1110. In step S1110, the control unit 105 determines whether the scanning of the document is completed. In a case where the control unit 105 determines that the scanning is not completed in step S1110, the control unit 105 waits for a certain time and then causes the processing to proceed to step S1107 to obtain the blank paper determination result from the blank paper determination processing unit 802 again. Meanwhile, in a case where the control unit 105 determines that the scanning is completed in step S1110, the control unit 105 causes the processing to proceed to step S1111. The processing proceeding to step S1111 means that the scanning of the document is completed and that the scanned image is determined to be a blank paper image. Accordingly, in step S1111, the control unit 105 determines that the document is a blank paper document and causes the processing to proceed to step S1113.

In step S1113, the control unit 105 does not print the scanned image data stored in the memory 106 and discards the scanned image data after the scanning by the scanner unit 102 is completed. The control unit 105 thus performs read skipping without executing copying of the blank paper document.

The control unit causes the processing to proceed to step S1112 after the document is confirmed not to be a blank paper image in step S1109 as described above. In other words, in the embodiment, even if the interrupt notification for the chase control is made, the chase control is not performed until the result of blank paper determination is confirmed.

Next, description is given of processing performed in a case where the control unit 105 determines that no chase control is to be performed in step S1103. In a case where the control unit 105 determines that no chase control is to be performed in step S1103, the control unit causes the processing to proceed to step S1114.

In step S1114, the control unit 105 requests the scanner unit 102 to execute scanning. Then, the scanner unit 102 starts to scan the document. With the start of the scanning of the document, the scanned image data of the document is sent to the memory 106 via the scanned image processing unit 108 line by line. Note that, in a case where the variable magnification is set, the scanned image data is subjected to variable magnification processing according to the variable magnification.

In step S1115, the control unit 105 receives the result of blank paper determination. Processing similar to that in steps S1108 to S1111 are performed in steps S1116 to S1119.

Next, in step S1120, after the image data of one page is stored, the control unit 105 performs print processing similar to that in step S1112, according to the determination result confirmed in step S1117 in which the scanned image is determined not to be a blank paper document. Meanwhile, in step S1121, the control unit 105 performs blank paper document read skip processing as in step S1113, according to the determination result confirmed in step S1119 in which the scanned image is determined to be a blank paper document. Since the print processing is similar to that described in step S1112 and the blank paper document read skip processing is similar to that described in step S1113, description thereof is omitted.

As described above, in the embodiment, the chase control can be performed also in copying utilizing the blank paper determination processing.

Embodiment 4

Figure 12B:
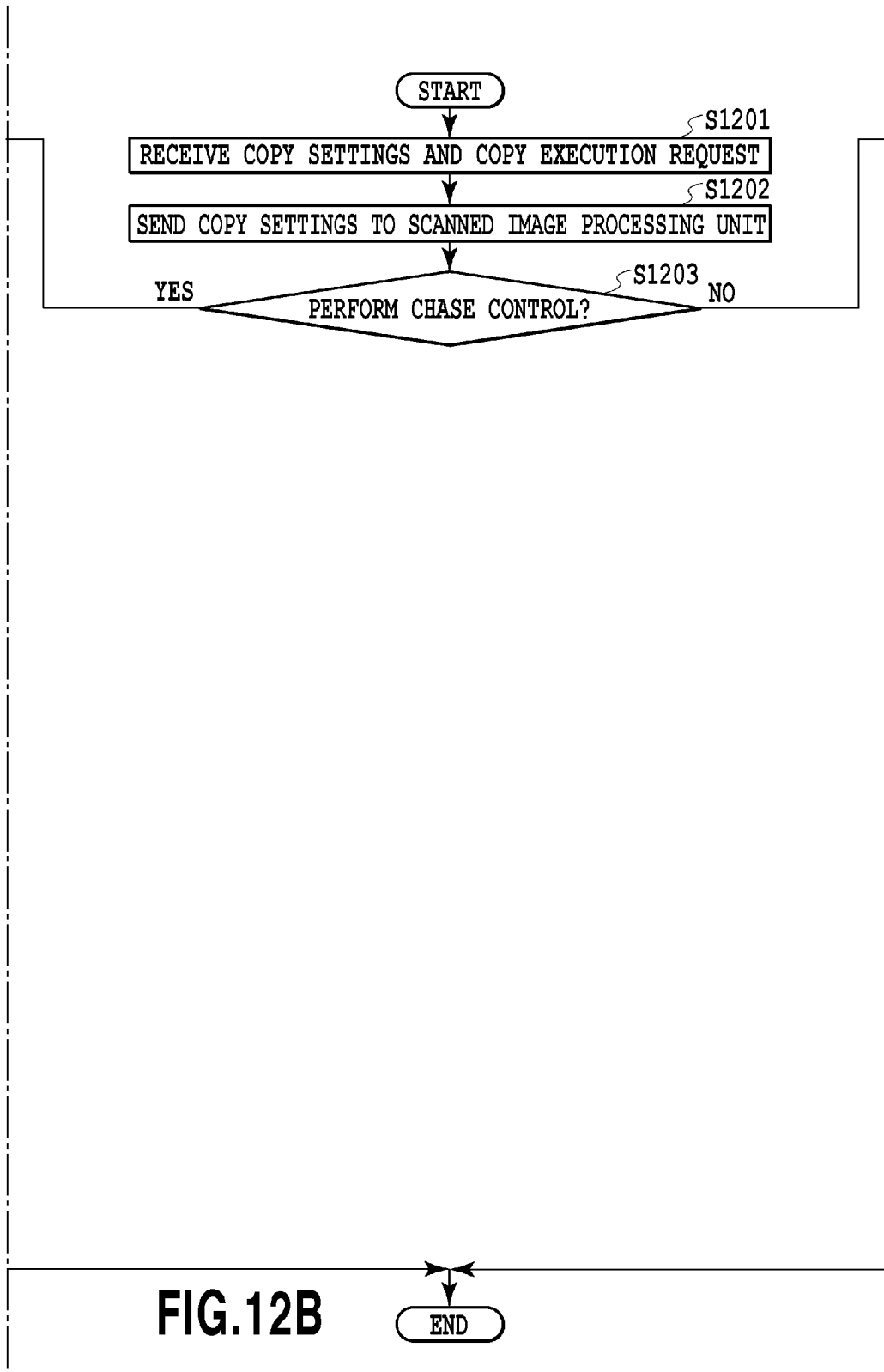
Figure 12C:
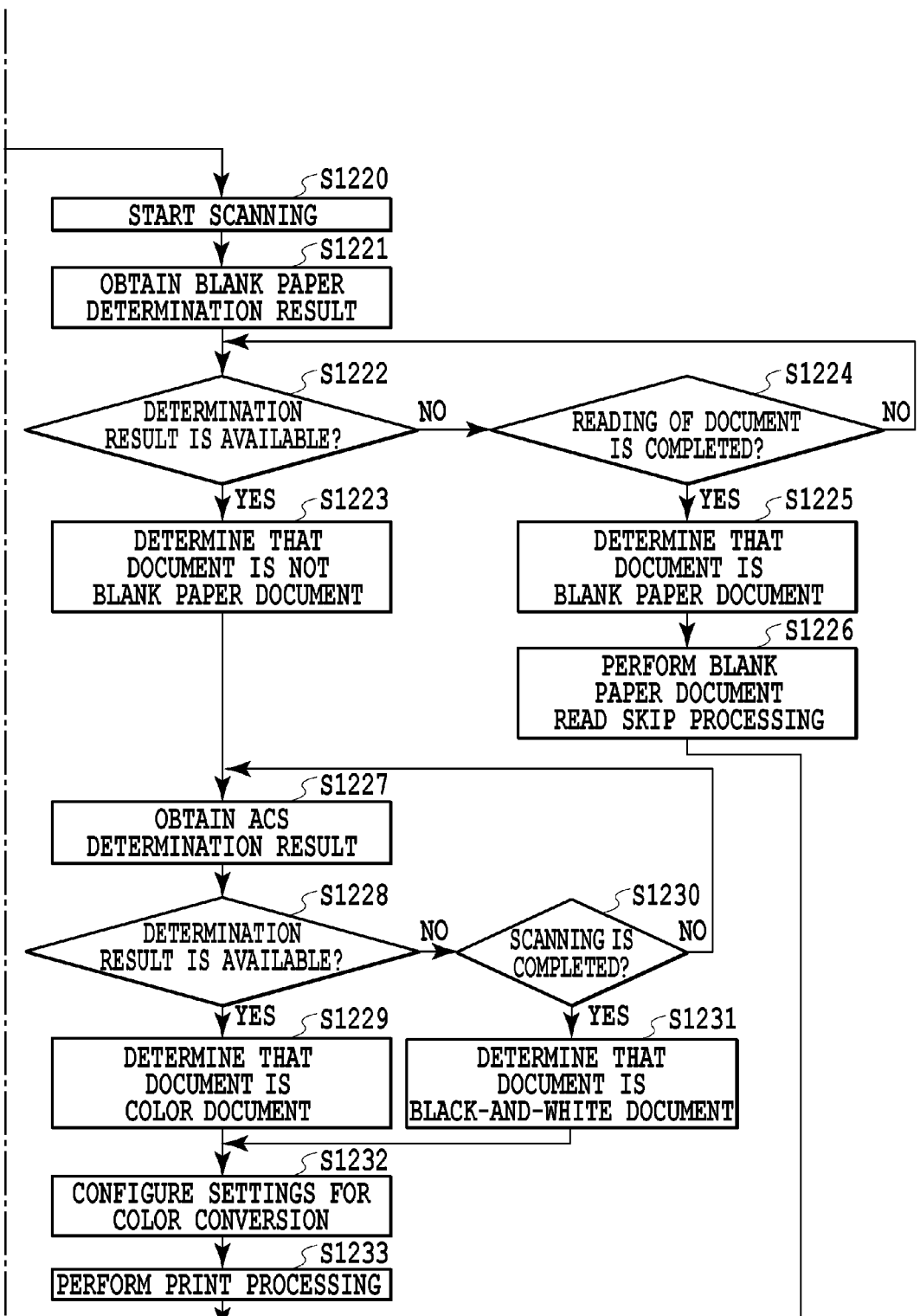

Next, a "chase control" performed in a case where the color mode is set to ACS determination and the blank paper removing function is set up is described as Embodiment 4 by using FIGS. 12A to 12C. Note that, since a configuration of a copier is similar to that described in Embodiment 3, description thereof is omitted. FIGS. 12A to 12C are a flowchart of processing executed by the controller 101 of the copier in the embodiment. The processing shown in FIGS. 12A to 12C is implemented by the control unit 105 executing a control program stored in the memory 106 and the storage unit 107.

Since processing in steps S1201 to S1204 are similar to that described in steps S601 to S604 in Embodiment 1, description thereof is omitted.

In steps S1205, the control unit 105 requests the scanner unit 102 to execute scanning. Then, the scanner unit 102 starts to scan the document. With the start of the scanning of the document, the scanned image data of the document is sent to the histogram generating unit 901 of the scanner unit 102 and the histogram is generated. Moreover, the scanned image data of the document is sent to the memory 106 via the scanned image processing unit 108 line by line. Note that, as described above, since the variable magnification in the case where the processing proceeds to step S1205 is 100%, the variable magnification unit does nothing. Moreover, the ACS determination processing unit 201 performs the ACS determination on each of the lines of the scanned image data as described above.

In step S1206, the DMA controller 204 of the scanned image processing unit 108 sends the memory 106 the scanned image data of lines whose number is equal to the chase control start line number $l_m$ set in step S1204, and then makes the interrupt notification to the control unit 105.

In step S1207, the control unit 105 obtains the determination result of blank paper determination processing from the blank paper determination processing unit 802 of the scanner unit 102 upon detecting the interrupt notification from the DMA controller 204. Note that the result of blank paper determination is made available at the point of step S1207 in some cases but not in others. The case where the result of blank paper determination is made available is the case where the peak corresponding to the portions of characters and the like in the document is equal to or greater than the threshold value as described above in the histogram of the scanned image data of the chase control start line number $l_m$. In such a case, the control unit 105 can obtain a determination result in which the scanned image data is determined not to be blank paper, as the result of blank paper determination.

In the case where the control unit 105 determines that the blank paper determination result is made available in step S1208, i.e. in the case where the determination result of blank paper determination processing is not blank paper image, the control unit 105 causes the processing to proceed to step S1209 and determines that the document is not a blank paper document. Since the document is confirmed not to be a blank paper document in step S1209, the control unit 105 causes the processing to proceed to step S1213.

Meanwhile, in the case where the result of blank paper determination is not made available yet in step S1208, the control unit 105 causes the processing to proceed to step S1210. In step S1210, the control unit 105 determines whether the scanning of the document is completed. In a case where the control unit 105 determines that the scanning is not completed in step S1210, the control unit 105 waits for a certain time and then causes the processing to proceed to step S1207 to obtain the blank paper determination result from the blank paper determination processing unit 802 again. Meanwhile, in a case where the control unit 105 determines that the scanning is completed in step S1210, the control unit 105 causes the processing to proceed to step S1211. The processing proceeding to step S1211 means that the scanning of the document is completed and that the scanned image is determined to be a blank paper image. Accordingly, in step S1211, the control unit 105 determines that the document is a blank paper document and causes the processing to proceed to step S1212. In step S1212, the control unit 105 does not print the scanned image data stored in the memory 106 and discards the scanned image data after the scanning by the scanner unit 102 is completed. The control unit 105 thus performs read skipping without executing copying of the blank paper document.

In step S1213, the control unit 105 obtains the determination result of ACS determination processing from the scanned image processing unit 108. Note that the result of ACS determination is made available at the point of step S1213 in some cases but not in others. The case where the result of ACS determination is made available is the case where the number of contiguous color lines becomes equal to or greater than the threshold value as described above before the number of read lines reaches the chase control start line number $l_m$ or a case where the number of contiguous color lines is equal to or greater than the threshold value in the scanned image data obtained at the point of confirmation of the blank paper determination result. In such cases, the control unit 105 can obtain a determination result in which the scanned image data is determined to be color image data, as the result of ACS determination.

In the case where the control unit 105 determines that the ACS determination result is made available in step S1214, i.e. in the case where the determination result of ACS determination processing is color image data, the control unit 105 causes the processing to proceed to step S1215 and determines that the document is a color document. Since the document is confirmed to be a color document in step S1215, the control unit 105 causes the processing to proceed to step S1218.

Meanwhile, in the case where the result of ACS determination is not made available yet in step S1214, the control unit 105 causes the processing to proceed to step S1216. In step S1216, the control unit 105 determines whether the scanning of the document is completed. In a case where the control unit 105 determines that the scanning is not completed in step S1216, the control unit 105 waits for a certain time and then causes the processing to proceed to step S1213 to obtain the ACS determination result from the ACS determination processing unit 201 again. Meanwhile, in a case where the control unit 105 determines that the scanning is completed in step S1216, the control unit 105 causes the processing to proceed to step S1217. The processing proceeding to step S1217 means that the scanning of the document is completed and that the scanned image is not determined to be a color image. Accordingly, in step S1217, the control unit 105 determines that the document is a black-and-white document. The control unit causes the processing to proceed to step S1218 after the document is confirmed to be a color image or a black-and-white image in step S1215 or step S1217 as described above. In other words, in the embodiment, even if the interrupt notification for the chase control is made, the chase control is not performed until the results of both of the ACS determination and the blank paper determination are confirmed.

In the case where the document is confirmed to be a color document in step S1215, the control unit 105 sets up the print image processing unit 109 for the conversion from RGB to CMYK in step S1218. Meanwhile, in the case where the document is confirmed to be a black-and-white document in step S1217, the control unit 105 sets up the print image processing unit 109 for the conversion from RGB to K in step S1218.

In step S1219, the control unit gives an instruction to start the print processing. Starting the print processing means that the control unit 105 makes an interrupt notification to the DMA controller 401 of the print image processing unit 109. Upon receiving this interrupt notification, the DMA controller 401 of the print image processing unit 109 reads the scanned image data stored in the memory 106 line by line and sends the scanned image data to the color converting unit 402. In other words, the print processing based on the chase control is performed. The color converting unit 402 performs color conversion on the scanned image data, according to the aforementioned settings in step S1218, and sequentially sends color conversion results to the printer unit 103. The printer unit 103 prints the color conversion results sent from the print image processing unit 109 on a print sheet.

Next, description is given of processing performed in a case where the control unit 105 determines that no chase control is to be performed in step S1203. In a case where the control unit 105 determines that no chase control is to be performed in step S1203, the control unit causes the processing to proceed to step S1220.

In step S1220, the control unit 105 requests the scanner unit 102 to execute scanning. Then, the scanner unit 102 starts to scan the document. With the start of the scanning of the document, the scanned image data of the document is sent to the memory 106 via the scanned image processing unit 108 line by line. Note that, in a case where the variable magnification is set, the scanned image data is subjected to variable magnification processing according to the variable magnification.

In step S1221, the control unit 105 receives the result of blank paper determination. Processing similar to that in steps S1208 to S1211 are performed in steps S1222 to S1225. Moreover, in step S1227, the control unit 105 receives the result of ACS determination. Processing similar to that in steps S1214 to S1217 are performed in steps S1228 to S1231.

After the image data of one page is stored, in step S1226, the control unit 105 performs the blank paper document read skip processing as in step S1212, according to the determination result confirmed in step S1225 in which the document is determined to be a blank paper document.

Moreover, after the image data of one page is stored, in step S1232, the control unit 105 performs a color conversion processing similar to that in step S1218, according to the type of the document confirmed in step S1229 or step S1231. Then, the print processing is performed in step S1233. Since the print processing is similar to that described in step S1219, description thereof is omitted.

Although an example of a combination of processes of Embodiment 1 and Embodiment 3 is described in FIGS. 12A to 12C, the processes of Embodiment 2 and Embodiment 3 may be combined. Specifically, a following mode may be employed. Step S1204 of FIG. 12A is changed to the same processing as step S704 of FIG. 7A and the processing of step S1206 of FIG. 12A is deleted. Moreover, processes corresponding to steps S751 and S752 of FIG. 7A are added respectively after steps S1215 and S1217.

As described above, in the embodiment, the chase control can be performed also in copying utilizing both of the ACS determination processing and the blank paper determination processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-067199, filed Mar. 27, 2013, and Japanese Patent Application No. 2013-260506, filed Dec. 17, 2013, which are hereby incorporated by reference herein in their entirety.

What is claimed is:

1. A copier operable in an auto color select mode, the copier comprising:
 a scanner configured to scan a page and to generate page image data;
 a storage unit configured to store the page image data generated by the scanner;
 a determination unit configured in the auto color select mode to determine whether or not the page image data is color image data by analyzing at least a part of the page image data;
 a processing unit configured to perform an image process for printing, the image process for printing being based on the determination result; and
 a control unit configured to perform a chase control of starting a print process for the stored page image data before the full page image data is stored, according to at least a condition that image data of a predetermined data size is stored by the scan, wherein, in the auto color select mode, the control unit is further configured not to start performing the chase control until image data of the predetermined data size is stored in the storage unit by the scan and the determination unit determines the page image data is color image data, and to start performing the chase control according to conditions that image data of the predetermined data size is stored in the storage unit by the scan and the determination unit determines the page image data is color image data.

2. The copier according to claim 1, wherein the chase control includes a control for causing the processing unit to perform the image process for printing which is based on the determination result.

3. The copier according to claim 1, wherein in the auto color select mode the control unit is further configured not to start performing the chase control until the determination unit determines the page image data is color image data, even though image data of the predetermined data size is stored in the storage unit by the scan.

4. The copier according to claim 1, wherein the predetermined data size is less than a data size of the full page image data.

5. The copier according to claim 1, wherein the image process for printing includes a color conversion process.

6. The copier according to claim 1, wherein in a full color mode other than the auto color select mode, the determination unit is further configured not to perform the determination, and
in the full color mode, the control unit is further configured to start performing the chase control according to a condition that image data of the predetermined data size is stored in the storage unit by the scan.

7. A copier operable in an auto color select mode, the copier comprising:
a memory;
a scanner configured to scan a page and to store page image data into the memory;
a determination unit configured in the auto color select mode to determine whether or not the page image data is color image data by analyzing at least a part of the page image data;
a processing unit configured to perform an image process for printing, the image process for printing being based on the determination result; and
a control unit configured to perform a chase control of starting a print process for the stored page image data before the full page image data is stored in the memory according to at least a condition that image data of a predetermined data size is stored in the memory by the scan,
wherein, in the auto color select mode, the control unit is further configured not to start performing the chase control until image data of the predetermined data size is stored in the memory by the scan and the determination unit determines the page image data is color image data, even though image data of the predetermined data size is stored in the memory by the scan, and
in the auto color select mode, the control unit is further configured to start performing the chase control according to conditions that (i) image data of the predetermined data size is stored in the memory by the scan and (ii) the determination unit determines the page image data is color image data, the chase control including causing the processing unit to perform the image process for printing on color image data on the stored page image data.

8. A method used for a copier which is operable in an auto color select mode, the method comprising:
scanning a page and storing page image data in a storage unit;
determining in the auto color select mode whether or not the page image data is color image data by analyzing at least a part of the page image data;
performing an image process for printing, the image process for printing being based on the determination result; and
performing a chase control of starting a print process for the stored page image data before the full page image data is stored according to at least a condition that image data of a predetermined data size is stored in the storage unit in the scanning step,
wherein, in the auto color select mode, the performing step of the chase control does not start performing the chase control until image data of the predetermined data size is stored in the storage unit in the scanning step and the page image data is determined to be color image data in the determining step, and starts performing the chase control according to conditions that image data of the predetermined data size is stored in the storage unit in the scanning step and the page image data is determined to be color image data in the determining step.

9. The method according to claim 8, wherein the chase control includes a control for causing a processing unit to perform the image process for printing which is based on the determination result.

10. The method according to claim 8, wherein in the auto color select mode the performing step of the chase control does not start performing the chase control until the page image data is determined to be color image data in the determining step, even though image data of the predetermined data size is stored in the storage unit in the scanning step.

11. The method according to claim 8, wherein the predetermined data size is less than a data size of the full page image data.

12. The method according to claim 8, wherein the image process for printing includes a color conversion process.

13. The method according to claim 8, wherein in a full color mode other than the auto color select mode, the determining step does not perform the determination, and
in the full color mode, the performing step of the chase control starts performing the chase control according to a condition that image data of the predetermined data size is stored in the storage unit in the scanning step.

14. A copier which scans a document, stores image data of the document in a memory, and performs a print process based on the image data, the copier comprising:
a determination unit configured to determine whether or not the image data is color image data;
an image processing unit configured to perform an image process for the print process based on a determination result by the determination unit; and
a control unit configured to start, if the determination result by the determination unit can be obtained when a predetermined number of lines of image data is stored in the memory, a print process based on the image data, the predetermined number of lines being smaller than the number of lines of one page of image data, wherein the control unit starts, if the determination result by the determination unit cannot be obtained when the predetermined number of lines of image data is stored in the memory, the print process based on the image data after the determination result is obtained.

15. The copier according to claim 14, further comprising a selecting unit configured to select an auto color select mode or a full color mode,
wherein the determination unit determines whether or not the image data is color image data in a case where the selecting unit selects the auto color select mode.

16. The copier according to claim 15, wherein, in a case where the full color mode is selected by the selecting unit, the control unit starts, when the predetermined number of lines of image data is stored in the memory, the print process based on the image data.

17. The copier according to claim 14, further comprising a deciding unit configured to decide the predetermined number of lines based on a speed of scanning and a speed of the print processing.

18. The copier according to claim 14, wherein the image process for the print process includes a color conversion process.

19. A method used for a copier which scans a document, stores image data of the document in a memory, and performs a print process based on the image data, the method comprising:
determining whether or not the image data is color image data;
performing an image process for the print process based on the determination result; and
starting, if the determination result can be obtained when a predetermined number of lines of image data is stored in the memory, a print process based on the image data, the predetermined number of lines being smaller than the number of lines of one page of image data,
wherein, if the determination result cannot be obtained when the predetermined number of lines of image data is stored in the memory, after the determination result is obtained, the print process based on the image data is started after the determination result is obtained.

20. The method according to claim 19, further comprising selecting an auto color select mode or a full color mode,
wherein whether or not the image data is color image data is determined in a case where the auto color select mode is selected.

21. The method according to claim 20, wherein, in a case where the full color mode is selected, the print process based on the image data is started when the predetermined number of lines of image data is stored in the memory.

22. The method according to claim 19, further comprising deciding the predetermined number of lines based on a speed of scanning and a speed of the print processing.

23. The method according to claim 19, wherein the image process for the print process includes a color conversion process.

* * * * *